Patented Nov. 13, 1923.

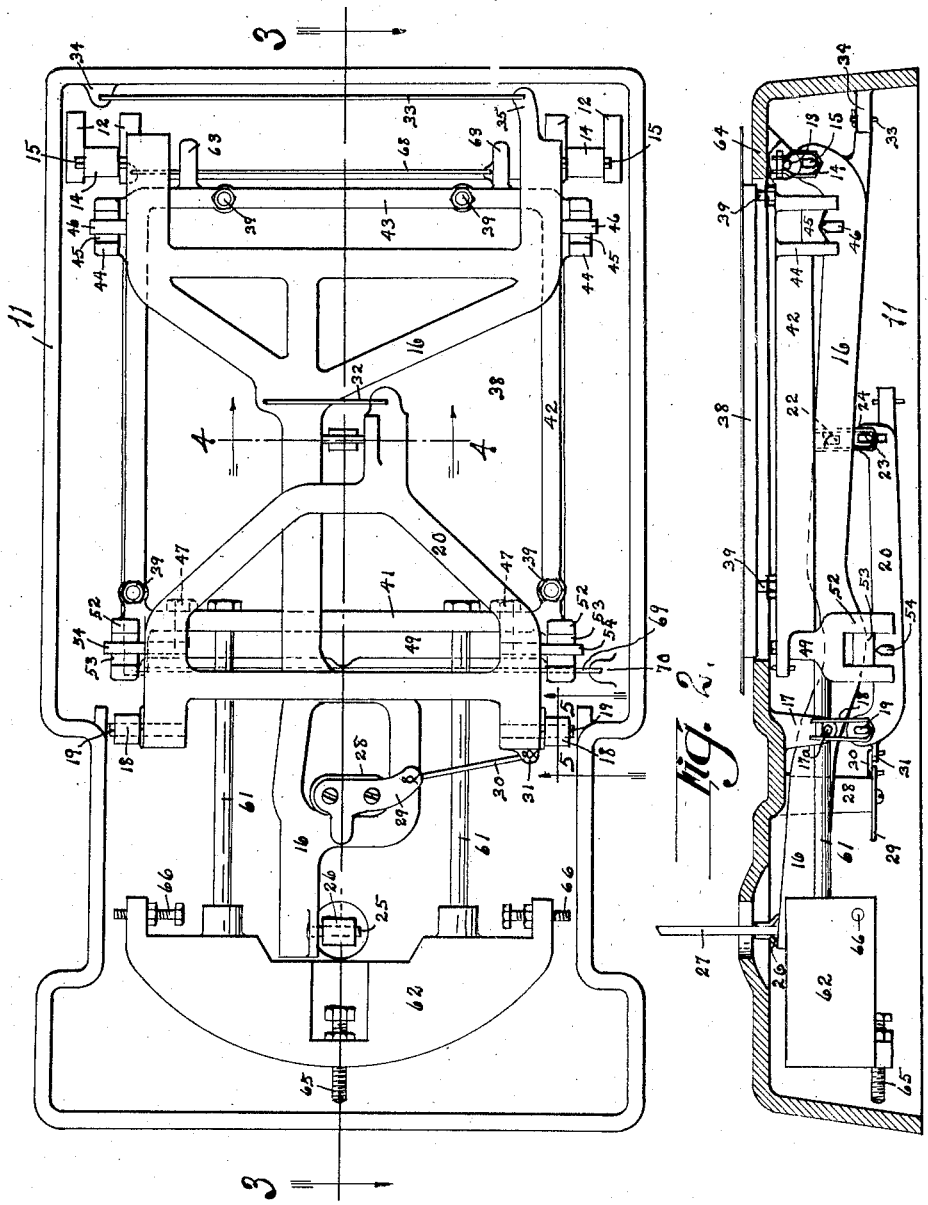

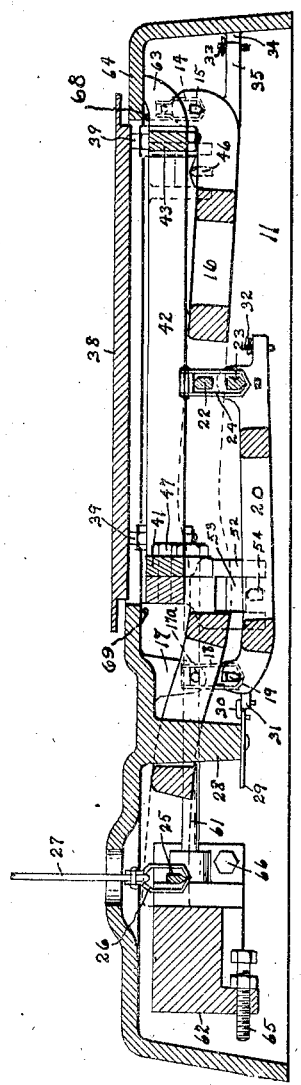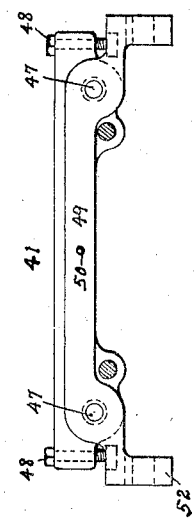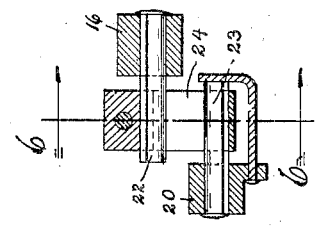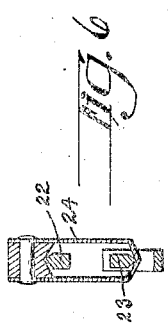

1,473,696

UNITED STATES PATENT OFFICE.

ADOLPH A. CAILLE, OF DETROIT, MICHIGAN.

LEVER SYSTEM FOR SCALES.

Application filed September 23, 1921. Serial No. 502,674.

*To all whom it may concern:*

Be it known that I, ADOLPH A. CAILLE, a citizen of the United States, and residing at Detroit, in the county of Wayne and State of Michigan, have invented a new and Improved Lever System for Scales, of which the following is a specification.

This invention relates to the construction and arrangement of the levers in the bases of weighing scales and its object is to provide a lever system which will evenly transmit the stresses due to the loads on the platform irrespective of the location of the load on the platform; that is, to provide a lever system which will not be tilted out of alinement when the platform is unevenly loaded.

This invention consists in combination of a main and secondary lever and knife-edge bearings for supporting the same within a scale base, of a platform frame supported on said levers, and a heavy counterweight connected to the platform frame and supported a distance from the bearings for the levers. It also consists in the details of construction illustrated in the accompanying drawings and particularly pointed out in the claims.

In the drawings, Fig. 1 is a bottom plan of this improved lever system. Fig. 2 is an elevation thereof with the side of the platform broken away. Figs. 3, 4 and 5 are sections on the line 3—3, 4—4 and 5—5 of Fig. 1 respectively. Fig. 6 is a section on the line 6—6 of Fig. 4. Fig. 7 is a detail of the platform frame.

Similar reference characters refer to like parts throughout the several views.

The base 11 shown in the drawings has pairs of lugs 12 at its rear end which carry pins 13 on which the links 14 are mounted and these links support the fulcrum knife edges 15 of the main scale lever 16. Lugs 17 and pins 17ª support the links 18 which carry the fulcrum knife edges 19 of the secondary lever 20. The secondary lever is supported at the rear end on the main lever by means of the knife edges 22 and 23 and the link 24. The free front end of the main lever transmits the force of the load to weight resisting mechanism (not shown) by means of the knife edge 25, loop 26 and rod 27. Extending down from the base is a post 28 which supports an adjustable plate 29 from which a centering rod 30 extends to a lug 31 on the secondary lever. A second centering rod 32 prevents lateral movement between the main and secondary levers, while a third centering rod 33 extends from a lug 34 on the base to a lug 35 on the main lever.

The platform 38 attaches to the platform frame by the four adjustable posts 39. This frame is substantially rectangular, having sides 42 and ends 41 and 43. The sides have pedestals 44 at their rear ends which carry bearing blocks 45 resting on the load receiving knife edges 46 of the main lever. Secured to the end 41 by means of screws 47 and adjustable relative thereto by means of the screws 48 (Fig. 7) is a cross bar 49 which is rotatable on the pin 50 relative to this end 41. This cross bar has pedestals 52 at its ends which carry bearing blocks 53 resting on the load-receiving knife edges 54 on the secondary lever 20. Even bearing of these blocks 45 and 53 on the knife edges 46 and 54 is therefore easily obtained by the use of the screws 48.

The bearing edges of the several knife edges of each lever are preferably in the same plane and the distances between the axes of the knife edges 19 and 54 (Fig. 2) is preferably the same as between the axes of the knife edges 15 and 46, and the distance between the axes of the knife edges 54 and 23 is preferably the same as the distance between the knife edges 46 and 22.

Extending forwardly from the end bar 41 are two adjustable bolts or bars 61 on whose front ends is mounted a counterweight 62 of slightly greater weight than the combined weights of the platform 38 and the platform frame. This serves to normally press the arms 63 (Fig. 3) at the rear end of the platform frame against the inturned top 64 of the base, as indicated in Fig. 3 and when the screws 65 and 66 carried by the counterweight are turned against the side flanges of the base, the lever system is locked against movement, especially for shipment. When free however, the weight of the counter-weight, platform and platform frame is directly on the knife edges 54 so that both levers are loaded to a considerable extent at all times.

No matter where a load is placed on the scale, no tipping of the platform results, partly because of the accurately adjusted bearing blocks 53 but also because of the peculiar action of the counterweight 62. A centering rod 68 extending from the lug 12 on the base to an arm 63 on the platform frame and a second centering rod 69 extending from a lug 70 on the base to the diagonally opposite corner of the platform frame serve to keep the platform and frame in proper position.

The details of construction and proportions of the parts may all be changed by skilled scale makers without departing from the spirit of my invention set forth in the following claims.

I claim:—

1. In a lever system for weighing scales, the combination of a base and a main and a secondary lever suspended therein and each having load-receiving pivots, a platform frame embodying a pair of pedestals rigid therewith adapted to be mounted on the load-receiving pivots of the main lever, a pair of pedestals adjustable on the platform frame mounted on the load-receiving pivots of the secondary lever, and a platform mounted on the platform frame.

2. In a lever system for weighing scales, the combination of a base, a main and a secondary lever suspended therein and each having load receiving pivots, load resisting means connected to said levers fulcra for the levers, a load receiving frame mounted on said load receiving pivots, and a counterweight attached to the frame and having its center of gravity outside of the load receiving pivots of one lever so as to relieve the load receiving pivots of the other lever.

3. In a lever system for weighing scales, the combination of a base, a main and a secondary lever suspended therein and having load-receiving knife edges, said main lever having a central power transmitting arm extending beyond the fulcrum line of the secondary lever, a platform frame mounted on said load-receiving knife edges, a pair of bars extending from one end of the frame in the direction of the power arm of the main lever, and a counterweight mounted on the ends of said bars.

4. In a lever system for weighing scales, the combination of a base, a main and a secondary lever suspended therein and having load-receiving knife edges, said main lever having a central power transmitting arm extending beyond the fulcrum line of the secondary lever, a platform frame mounted on said load-receiving knife edges, a pair of bars extending from one end of the frame in the direction of the power arm of the main lever, and a counterweight mounted on the ends of said bars, said frame having arms at its end opposite said bars to engage below a ledge on the base to resist the force of the counterweight where the scale is unloaded.

5. In a lever system for weighing scales, the combination of a base, a main and a secondary lever suspended therein and having load-receiving knife-edges, said main lever having a central power transmitting arm extending beyond the fulcrum line of the secondary lever, a platform frame mounted on said load-receiving knife edges, a pair of bars extending from one end of the frame in the direction of the power arm of the main lever, a counterweight mounted on the ends of said bars and rods connecting to each end of each lever and to said platform frame and to the base to prevent lateral displacement of the levers and platform.

6. In a lever system for weighing scales, the combination of main and secondary levers having load-receiving pivots, load resisting means connected to said levers a platform mounted on the load-receiving pivots and means connected to the platform to transfer the major portion of the weight thereof to the load receiving pivots of one of the levers.

7. In a lever system for weighing scales, the combination of connected main and secondary levers, each having two load-receiving bearings, load resisting means connected to said levers and a load-receiving frame mounted on said four bearings, and embodying an adjustable member in engagement with two of said bearings.

8. In a lever system for weighing scales, the combination of main and secondary levers having load-receiving knife-edge pivots, a platform mounted on the load receiving pivots, load resisting means connected to said levers means connected to the platform to transfer the major portion of the weight thereof to the load receiving pivots of one of the levers, and means to prevent the platform from moving longitudinally of said pivots.

9. In a lever system for weighing scales, the combination of a base, a main and a secondary lever suspended therein and having load-receiving knife-edges, said main lever having a central power transmitting arm extending beyond the fulcrum line of the secondary lever, a platform frame mounted on said load-receiving knife-edges, a pair of bars extending from one end of the frame in the direction of the power arm of the main lever, a counterweight mounted on the ends of said bars and rods connecting to each end of each lever and to said platform frame and to the base to prevnt lateral displacement of the levers and platform, and rods connected to the base and to said platform frame to prevent the frame from moving longitudinally of said pivots.

10. In a lever system for weighing scales, the combination of a base, a main and a secondary lever suspended therein and having load-receiving knife-edges, said main lever having a central power transmitting arm extending beyond the fulcrum line of the secondary lever, a platform frame mounted on said load-receiving knife-edges, a pair of bars extending from one end of the frame in the direction of the power arm of the main lever, a counterweight mounted on the ends of said bars, said frame having arms at its end opposite said bars to engage below a ledge on the base to resist the force of the counterweight where the scale is unloaded.

ADOLPH A. CAILLE.